United States Patent
Arbon et al.

(10) Patent No.: US 7,480,822 B1
(45) Date of Patent: Jan. 20, 2009

(54) RECOVERY AND OPERATION OF CAPTURED RUNNING STATES FROM MULTIPLE COMPUTING SYSTEMS ON A SINGLE COMPUTING SYSTEM

(75) Inventors: Val Arbon, Orem, UT (US); Daniel H. Hardman, American Fork, UT (US)

(73) Assignee: Symantec Corporation, Cupertino, CA (US)

( * ) Notice: Subject to any disclaimer, the term of this patent is extended or adjusted under 35 U.S.C. 154(b) by 522 days.

(21) Appl. No.: 11/180,412

(22) Filed: Jul. 13, 2005

(51) Int. Cl.
*G06F 11/00* (2006.01)
(52) U.S. Cl. .............................. 714/13; 714/4; 714/15
(58) Field of Classification Search .................... 714/4, 714/5, 6, 7, 12, 13, 15
See application file for complete search history.

(56) References Cited

U.S. PATENT DOCUMENTS

| | | | |
|---|---|---|---|
| 5,488,716 A * | 1/1996 | Schneider et al. | 714/10 |
| 5,805,790 A * | 9/1998 | Nota et al. | 714/10 |
| 5,832,222 A * | 11/1998 | Dziadosz et al. | 709/216 |
| 6,728,746 B1 * | 4/2004 | Murase et al. | 718/1 |
| 6,973,587 B1 * | 12/2005 | Maity et al. | 714/6 |
| 7,197,561 B1 * | 3/2007 | Lovy et al. | 709/224 |
| 7,200,622 B2 * | 4/2007 | Nakatani et al. | 707/202 |
| 2003/0018927 A1 * | 1/2003 | Gadir et al. | 714/4 |
| 2004/0172574 A1 * | 9/2004 | Wing et al. | 714/4 |
| 2005/0108593 A1 * | 5/2005 | Purushothaman et al. | 714/4 |
| 2005/0172160 A1 * | 8/2005 | Taylor et al. | 714/4 |
| 2006/0271575 A1 * | 11/2006 | Harris et al. | 707/100 |

* cited by examiner

*Primary Examiner*—Joshua A Lohn
(74) *Attorney, Agent, or Firm*—AdvantEdge Law Group (57) ABSTRACT

Restoring access to running states of multiple primary computing systems onto a single computing system. The captured running states each include, or are altered to include, at least one device driver that is configured to interface with a common virtualization component that runs on the single computing system. The common virtualization component is configured to at least indirectly interface with hardware on the single computing system. The hardware potentially operates using a different interface than the device driver is configured to interface with. The system identifies a boot order for each of the primary computing systems, and then starts the running states for each of the primary computing systems in the appropriate boot order in a manner that takes advantage of the virtual environment exposed by the single computing system.

25 Claims, 7 Drawing Sheets

RECOVERY AND OPERATION OF CAPTURED RUNNING STATES FROM MULTIPLE COMPUTING SYSTEMS ON A SINGLE COMPUTING SYSTEM

BACKGROUND OF THE INVENTION

Computing technology has transformed the way we work and play. Businesses, residences, and other enterprises have come to rely on computing systems to manage their key operational data. Often, the data itself is many times more valuable to an enterprise than the computing hardware that stores the data. Accordingly, in this information age, many enterprises have taken precautions to protect their data.

One way of protecting data is to introduce storage redundancy. For example, a primary computing system maintains and operates upon the active data. Meanwhile, a backup computing system maintains a copy of the data as the active data existed at a previous instant in time. The backup copy of the data is periodically updated. More frequent updates tend to increase the freshness of the data at the backup computing system. At some point, the data at the primary computing system may become inaccessible or otherwise lost. When needed, the data is then transferred back from the backup computing system to the primary computing system.

For faster recovery, some backup systems perform volume-based backup in which all of the sectors of a particular volume are backed up. Such sectors may include application data, but may also include application programs, operating system(s), and associated configuration information. This protects against more severe failures in which more than just data is lost, but perhaps the entire volume has become corrupted. In that case, the previously backed-up volume is transferred from the backup computing system to the primary computing system. Reinstallation and reconfiguration of the operating system and application program is not needed since the installed and configured executable representations of the operating system and application programs are already present in the backed-up volume.

This traditional volume-based backup works well so long as the primary computing system is still available to restore its running state to. Unfortunately, some failure events may result in not just lost data or state from a particular volume, but may also result in a loss of the hardware itself. In that case, unless there is an identical redundant primary computing system with the same hardware (which itself can be quite expensive), restoration of the backup volume is postponed until identical hardware is acquired. This can take substantial time. The problem is compounded when multiple computing systems have been lost in the failure event.

When recovering data access after such a failure, time is money. Depending on the enterprise size and operation, each minute without operational data may mean thousands, or even millions, of dollars in lost revenue. Therefore, what would be advantageous are mechanisms for efficiently restoring access to data and other operational state of multiple primary computing systems, even if the primary computing systems are no longer available, and without necessarily requiring replacement computing systems that have identical hardware as the lost primary computing systems.

BRIEF SUMMARY OF THE INVENTION

The foregoing problems with the prior state of the art are overcome by the principles of the present invention, which are directed towards mechanisms for restoring access to running states of multiple primary computing systems onto a single computing system. After capturing the running state for each of the primary computing systems, the single computing system then accesses and exposes for external use the captured running states. The captured running states each include, or are altered to include, at least one device driver that is configured to interface with a common virtualization component that runs on the single computing system.

The common virtualization component is configured to at least indirectly interface with hardware on the single computing system. The hardware potentially operates using a different interface than the device driver in the capture running state is configured to interface with. The system identifies a boot order for each of the primary computing systems, and then starts the running states for each of the primary computing systems in the appropriate boot order.

Accordingly, access to the running state of the primary computing systems is restored on a single computing system, and without requiring the primary computing systems' hardware. This can significantly reduce the amount of time needed to restore access to the functionality offered by the primary computing systems. Furthermore, this process may be used to test the recovery even if the primary computing systems continue operation.

Additional embodiments of the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for restoring access to running states of multiple primary computing systems onto a single recovery computing system. This permits for rapid recovery of the functionality provided by the primary computing systems in case the primary computing systems cease operation. Alternatively, this allows the recovery to the recovery computing system to be tested even if the primary computing systems continue operation.

First, a general computing system will be described with respect to FIG. 1, as being a suitable computing system that may be used to practice the principles of the present invention. Then, general restore operations consistent with the principles of the present invention will be described in further detail with respect to FIGS. 2 and 3. A method for deriving a boot order will then be described with respect to FIGS. 4 through 8. Finally, the application of the principles of the present invention to quickly restore a complex network site will be described with respect to FIG. 9.

Figure 1:
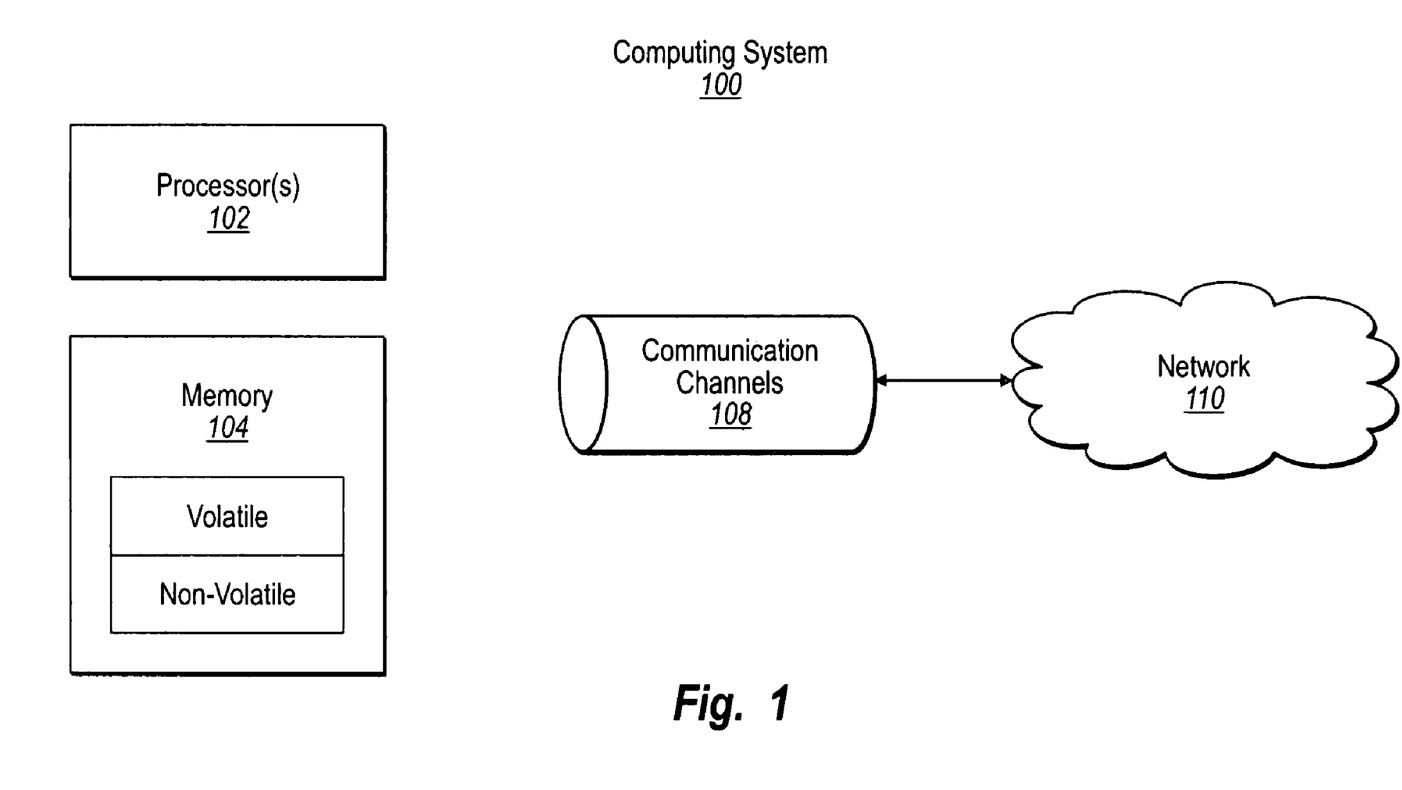
FIG. 1 illustrates a computing system that may be used to implement the principles of the present invention.

FIG. 1 shows a schematic diagram of an example computing system that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the systems and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Figure 2:
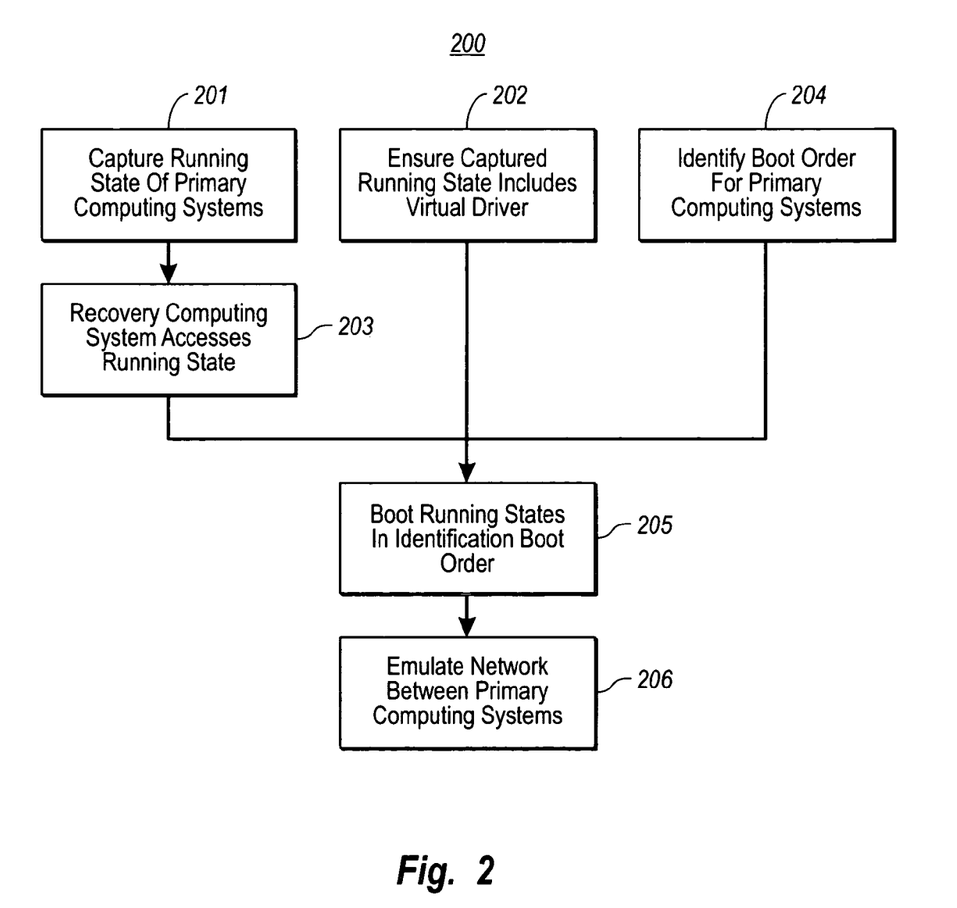
FIG. 2 illustrates a flowchart of a method for restoring access to the running state of multiple primary computing systems onto a single recovery computing system in accordance with the principles of the present invention.
Figure 3:
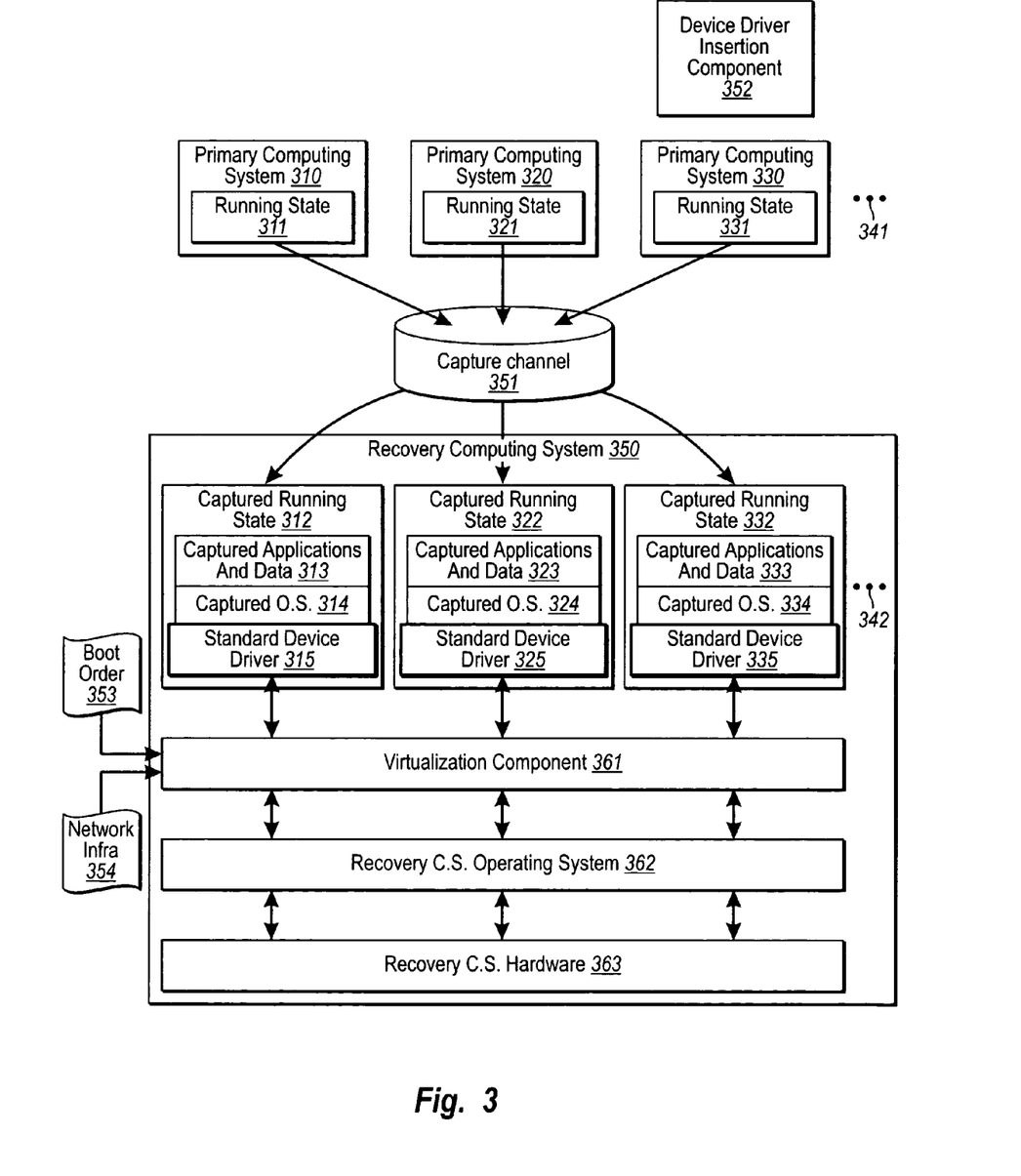
FIG. 3 illustrates an environment in which the principles of the present invention may operate, including a recovery computing system, multiple primary computing systems, and a driver insertion component.

FIG. 2 illustrates a flowchart of a method 200 for restoring access to running states of multiple primary computing systems onto a single recovery computing system. FIG. 3 illustrates an environment 300 in which the running states of multiple primary computing systems are recovered to a single recovery computing system. The recovery computing system may then provide the functionality offered by all of the primary computing systems by operating upon the running state. As the method 200 of FIG. 2 may be performed in the environment 300 of FIG. 3, the method 200 will now be described with frequent reference to the environment 300.

The method 200 includes capturing the running states of each of the primary computing systems (act 201). Referring to FIG. 3, the example environment 300 includes three illustrated primary computing systems 310, 320 and 330, amongst potentially many more as represented by the ellipses 341. The primary computing systems 310, 320 and 330 may, but need not, be structured as described above for the computing system 100 of FIG. 1. Although three primary computing systems are illustrated in the environment 300, the principles of the present invention may be applied to recover the running state of any number of multiple primary computing systems.

Each primary computing system has an associated running state. For instance, primary computing systems 310, 320 and 330 have corresponding running states 311, 321 and 331, respectively. The running state may be an entire volume or set of volumes that includes application data, the executable instructions for application programs, the executable instructions for the operating system, and configuration information for the application programs and the operating system. The running state may also include compressed or encrypted forms of the volume. The running state may also include just a portion of the volume, just specific files or folders, or transformations of instructions or data on the volume. For instance, computer-executable instructions that conform to one instruction set, may be transformed to computer-executable instructions that conform to another instruction set.

Each of the running states is captured via the use of capture channel 351. The capture channel 351 includes the mechanisms used to acquire the running state from the respective primary computing systems, and provide the running state to the recovery computing system 350. Such a capture channel need not contain communications media only, but also may include storage in which the captured running state may be stored for a period of time prior to being provided to the recovery computing system 350. For instance, the capture channel 350 may include a Storage Area Network (SAN).

Referring back to FIG. 2, the method 200 includes ensuring that each of the captured running states includes device driver(s) that are configured to interface with a common virtualization component (act 202). Referring to FIG. 3, the device driver insertion component 352 inserts device drivers into the running state. For instance, standard device driver(s) 315 is inserted into running state 311, standard device driver(s) 325 is inserted into running state 321, and standard driver(s) 335 is inserted into running state 331.

These standard drivers may be inserted at any point. For instance, the standard drivers may be inserted into the running state while the running state is still on the primary computing system 310, 320 or 330, while the running state is in the capture channel 351, or after the running state is restored to the recovery computing system 350. The standard device drivers comprise computer-executable instructions that interface correctly with a common virtualization component such as virtualization component 361.

Returning to FIG. 2, after capturing the running state for each primary computing system (act 201), the method 200 restores the capture running state to the single recovery computing system (act 203). Referring to the example of FIG. 3, the running state 311 is restored to the recovery computing system 350 in the form of captured running state 312. Similarly, the running states 321 and 331 from the other primary computing systems are restored in the form of captured running states 322 and 332, respectively. If there were more primary computing systems as represented by ellipses 341, then the associated captured running states may be restored to the recovery computing system 350 as represented by ellipses 342. The recovery computing system 350 may, but need not, be structured as described above for computing system 100, and may be distributed over a network. Furthermore, although there is much discussion herein about multiple running states being restored to a single recovery computing system, that does not imply that there cannot be other recovery computing systems in any particular network that also have one or more running states restored to them. For instance, there may be one hundred running states that are restored to ten different recovery computing systems. Nevertheless, looking at a single one of those recovery computing systems, there may be multiple running states restored to that single recovery computing system.

Each of the captured running states includes computer-executable instructions that, when executed by one or more processors of the recovery computing system, cause the applications and operating systems for the associated primary computing system to become operational. For instance, captured running state 312 includes captured application programs and data 313 and the captured operating system 314 that operated upon the primary computing system 310. Similarly, captured running state 322 includes captured application programs and data 323 and the captured operating system 324 that operated upon the primary computing system 320. Finally, captured running state 332 includes captured application programs and data 333 and the captured operating system 334 that operated upon the primary computing system 330.

As previously mentioned, each of the captured running states includes standard device driver(s) (e.g., 315, 325 and 335) that are configured to interface with the common virtualization component 361 that runs on the recovery computing system 350. The virtualization component 361 contains executable instructions that, when executed by one or more processors of the recovery computing system 350, causes the recovery computing system 350 to at least indirectly interface with hardware 363 of the recovery computing system 350. If the recovery computing system is represented by the computing system 100 of FIG. 1, the execution of such instructions by processor(s) 102 may instantiate the common virtualization component 361.

In the illustrated embodiment, the virtualization component 361 interfaces with the recovery computing system hardware 363 using the recovery computing system's operating system 362. An example of the virtualization component is VMWARE®, although other similar product may do as well. The standard device driver(s) may include one driver for interfacing with a network interface, and one driver for interfacing with a disk driver, and other drivers as desired. The device drivers may be standardized across all running states. Thus, each captured running state will include a common Network Interface Card (NIC) device driver, a common disk drive device driver, and a common driver for other classes of hardware as desired.

Whatever the interface used by such device drivers, the virtualization component 361 receives communications from the standard device drivers, and provides appropriate equivalent commands through the operating system 362 to the recovery system hardware 363. Likewise, communications received from the recovery system hardware 363 or operating system 362 are translated into appropriate commands for communication to the standard device drivers. While it is most convenient if the standard device drivers be the same for all captured running state, this is not a requirement if the virtualization component is capable of more flexibility in the types of standard device drivers the virtualization component will communicate with.

Returning to FIG. 2, a suitable boot order for the primary computing systems is also identified (act 204). This may be done at any time. This determination may done by monitoring prior boots for the primary computing systems, and identifying the boot order based on those prior boots. For instance, if the primary computing systems are booted in a particular order seventy percent of the time, that boot order may be identified as suitable in act 204. Also, one could use a table of the various well known services like DNS, DHCP, AD, etc and their dependencies among each other to generate an approximate boot order. A much more complex example of how a boot order may be derived is described below with respect to FIGS. 4 through 8. The boot order derivation method described below with respect to FIGS. 4 through 8 takes into account the various interdependencies of the computing services provided across the various computing systems. Whether the boot order is calculated by monitoring prior boots, or by performing the method described with respect to FIGS. 4 through 8, or whether the boot order is calculated in some other way, will depend on the environment and sensitivity to obtaining a correct boot order. The example boot order calculation method of FIGS. 4 through 8 will be described upon completing the description of FIGS. 2 and 3. In the illustrated embodiment, the boot order 353 is provided to the virtualization component 361.

The method 200 then boots the captured running states for each of the primary computing systems in the identified boot order (act 205). For instance, upon identifying the first primary computing system that is to be booted, the virtualization component 361 causes the recovery computing system to execute the BIOS of the recovery computing system. Communications to the operating system are caused to pass to the captured operating system for that associated running state. This process is repeated for subsequent running states in the boot order, until all running states are operational.

Returning to FIG. 2, the common virtualization component emulates the network between at least two of the primary computing systems when the captured running states of the at least two primary computing systems attempt to communicate over the network (act 206). Network infrastructure instructions 354 instruct the virtualization component 361 on the network infrastructure that existed with the primary computing system. For instance, the instructions may specify the address ranges used by each primary computing system. The virtualization component 361 may virtualize network communications between primary computing systems by receiving the network communication from the source running state (using the standard NIC device driver for the source running state), interpreting the destination address in light of the network infrastructure instructions 354, and then providing the network communication (using the standard NIC device driver for the destination running state) to the destination running state.

Accordingly, the principles of the present invention permit the running states for multiple primary computing systems to be restored to a single recovery computing system. The running states may be made operational on the recovery computing system, and so the functionality of the primary computing systems is recovered prior to the physical hardware associated with the primary computing systems being restored. This permits for faster recovery, thereby reducing downtime. In addition, the principles of the present invention may be practiced even if the primary computing systems continue operation. In that case, the operation of the running states on the recovery computing system allows for testing of the recovery operation without ever losing functionality of the primary computing systems.

Having described the principles of the present invention with respect to FIGS. 2 and 3, the description now turns to a method for identifying the boot order for the primary computing systems. This method is one of many methods that may be used to generate the boot order information 353, and will be described in detail with respect to FIGS. 4 through 8.

Figure 4:
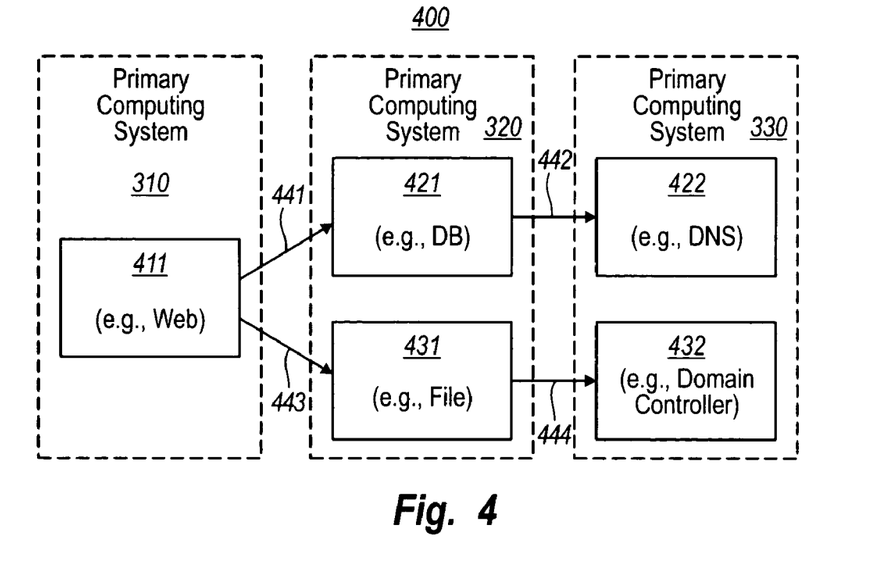
FIG. 4 illustrates an example system that includes multiple interdependent computing services distributed across multiple primary computing systems.

FIG. 4 illustrates an example 400 of the several computing services that may be present on the primary computing systems 310, 320 and 330. Specifically, in this example, primary computing system 310 operates computing service 411, primary computing system 320 operates computing services 421 and 431, and primary computing system 330 operates computing services 422 and 432. The computing services 411, 421, 422, 431 and 432 are shown to illustrate an example of computing services that have dependencies as represented by arrows 441 through 444. Of course, this is just an example. The primary computing systems may operate any different kinds of computing services having various dependencies.

To illustrate the kind of dependencies that may occur in a real life situation, an example of the computing service 411 is illustrated as being a Web service, an example of the computing service 421 is a database (DB) server, an example of the computing service 422 is a Domain Name Server (DNS) server, an example of the computing service 431 is a file server, and an example of the computing service 432 is a domain controller.

In this example, the Web server typically relies on the database server (as represented by dependency arrow 441) to populate Web pages with dynamic data. While the Web server may operate without the database server, its operation will not be optimal if it is unable to populate Web pages with dynamic data. The Web server may also rely on the file server (as represented by dependency arrow 443) for some of the resources (e.g., images, video, sounds, executable controls) that it exposes.

The Web server may authenticate to the file server using credentials which are validated by the domain controller. Thus, the file server cannot provide full services to the Web server until the domain controller is operational (as represented by dependency arrow 444).

The Web server finds the database server using data supplied by the DNS server. Thus, the database server cannot provide full services to the database server until the DNS server is operational (as represented by dependency arrow 442).

This initialization order for this example system may likely be easy to manually determine for an experienced Information Technology (IT) professional. However, the example has been kept quite simple in order not to obscure the principles of boot order determination. Ordinary production environments are commonly much more complex. It would be a laborious or practically impossible task for even an experienced IT professional to manually identify all of the particular dependencies in such a complex network, and to update such a model accurately as the fabric evolves over time.

Figure 5:
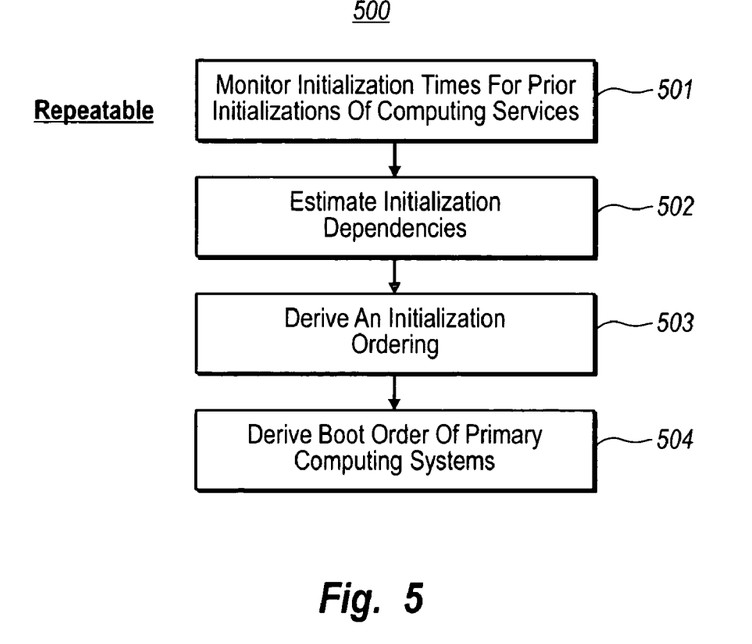
FIG. 5 illustrates a flowchart of a method for automatically deriving an order of dependency between multiple computing services distributed across multiple primary computing systems.

FIG. 5 illustrate a flowchart of a method 500 for automatically deriving an initialization ordering for a number of computing services distributed over multiple primary computing systems. As the method 500 of FIG. 5 may be performed on the example system 400 of FIG. 4, the method 500 will be described with frequent reference to the example system 400. However, the principles of the boot order calculation may be applied to any number of primary computing systems. In one example embodiment referred to herein as the "physical boot embodiment", the computing service is a physical bootable machine, and the initialization of the computing service is the booting of the physical machine.

The method 500 includes monitoring initialization timestamps for the computing services for one or more prior initializations of the computing services (act 501). If is it desired to derive a current initialization ordering, the most recent initializations may be monitored. If it is desired to determine an acceptable initialization ordering for a prior instant in time, the initializations proximate to that prior instant in time may be evaluated. If it is desired to determine an initialization ordering for a future point in time, then the schedule for computing service initializations proximate that future point in time may be monitored. In the case of FIG. 3, for example, it is desirable to identify a good boot order that existed at the time the primary computing systems had their running state captured. In that case, the initializations proximate to that capture operation may be evaluated in act 501. In the case of the physical boot embodiment, the physical primary computing systems 310, 320 and 330 are themselves the computing services. Accordingly, in the physical boot embodiment, such initialization times may be boot times of the various primary computing systems 310, 320 and 330.

Regardless of whether the time is the current time, some prior point in time, of some future point in time, the evaluations may give greater weight for initializations that are closer to the point of time of interest. For instance, initialization that occurred five minutes prior to the capture may be given greater weight than initializations ten hours prior to the capture.

Figure 6:
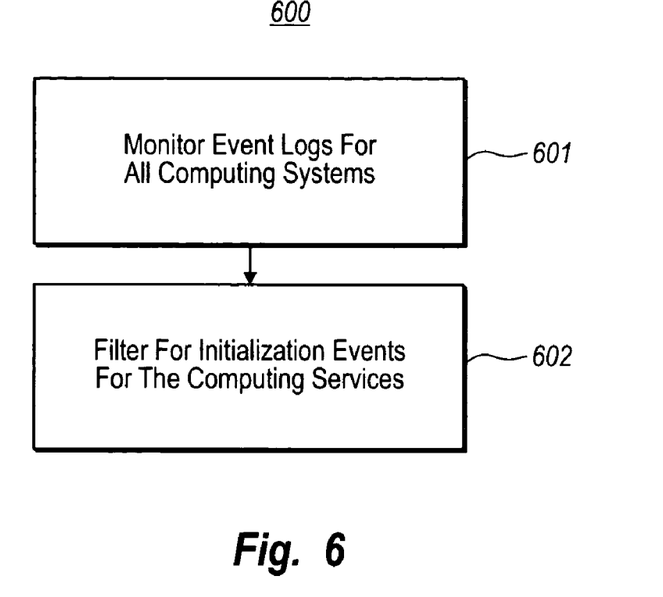
FIG. 6 illustrates a flowchart of a method for monitoring initialization times for prior initializations of computing services.

FIG. 6 is a flowchart of an example method 600 for monitoring initialization times and represents just one example of a suitable method for performing the monitoring act of act 501. For instance, the boot order derivation may involve monitoring one or more initialization event logs for each of the bootable computing systems (act 601) that operates a computing service in the system. For instance, the Microsoft WINDOWS® operating system contains event logs with readable entries. Linux and Unix and many mainframe operating systems have log files. The event logs may contain more than just initialization information.

The boot order derivation may then filter the one or more initialization event logs for events related to initialization of the computing services under evaluation (act 602). This may be done by reading all entries in the log file that contain initialization timestamps for the computing services in the system under evaluation. Entries that do not relate to the initialization of the computing services may be ignored. For instance, an entry in a Microsoft WINDOWS® operating system event log that shows a firewall starting is not particularly relevant to a machine's role as a file or database server. However, entries that show low-level internal failures are useful to the extent that they may indicate high-level flawed initialization. Such internal failures may be used to devalue the weight given to that particular initialization attempt for the computing services.

The boot order derivation may guarantee comparability of timestamps across these multiple primary computing systems. This can be done by performing conventional server time synchronization. Alternatively, each machine may be queried for their current time reckoning, and then compensation factors may be calculated and applied to account for time reckoning differences across the computing systems, thereby creating synchronized equivalent time entries.

The following Table 1 represents example relevant time entries that may be acquired using the method 600 of FIG. 6 when applied to the example system 400 of FIG. 4.

TABLE 1

| Event Order | Initialization Time | Machine | Service |
|---|---|---|---|
| 1 | 12:03:21 am | 330 | Domain Controller |
| 2 | 12:05:19 am | 320 | File Server |
| 3 | 04:27:01 am | 330 | DNS Server |
| 4 | 04:43:32 pm | 330 | DNS Server |
| 5 | 05:11:45 pm | 320 | Database Server |
| 6 | 05:47:59 pm | 310 | Web Server |

In actual implementation, this table may be considerably more complex. Events covering many days and hundreds of computing systems could appear. The same service may show up several times in the list, and multiple services could map to the same physical machine. However, Table 1 has the following characteristics:

1) It captures an absolute ordering of events;
2) The events are computing service initializations;
3) The services are tied to the computing system that hosts the service; and
4) More than one service can be tied to the same computing system.

When evaluating the event logs, the technical names for the services may be quite different from the human-readable forms represented above. There could thus be a mapping of the technical names for the service to the more human-readable form of the service name. Minor differences in service identification could also optionally be collapsed by such a mapping, if greater ability to generalize from the data is desired. This might be helpful if a service name is modified slightly as part of an upgrade, for example.

Figure 7:
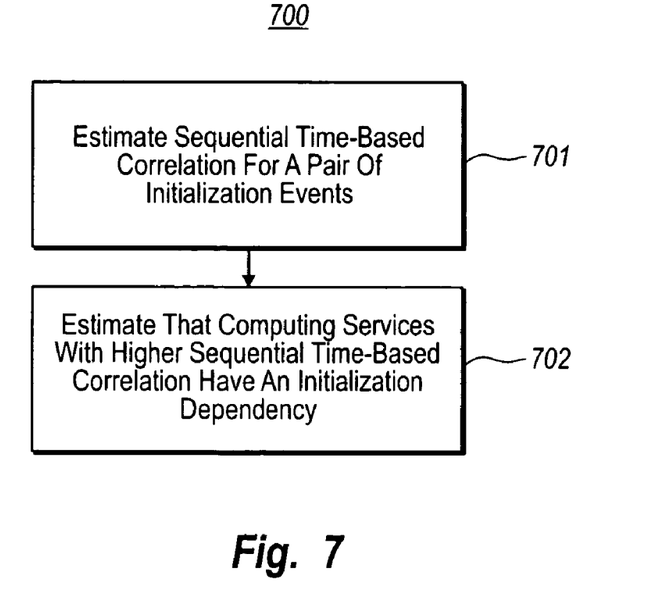
FIG. 7 illustrates a flowchart of a method for estimating initialization dependencies.

Returning to FIG. 5, initialization dependencies for pairs of the computing services in the system are then automatically estimated based on the initialization events (act 502). In the physical boot embodiment, these initialization dependencies are really boot dependencies between pairs of computing systems. FIG. 7 illustrates a flowchart of a method 700 for estimating initialization dependencies and serves as an example of one of many methods that may be used to perform act 502. For multiple event pairs of the initializations of the computing services, the boot order calculation may estimate a sequential time-based correlation for the initializations of each pair of computing services (act 701). In this description and in the claims, a sequential time-based correlation is a value that is a function of which initialization came first in the pair of computing services, as well as the time difference between the initializations.

For example, for each pair of initialization events, there might be two sequential time-based correlation values for computing services abstractly named A and B. The A after B value may be, for example, 0.8 on a scale of zero to one, indicating that the initialization of A often follows the initialization of B in a time frame that suggests A is dependent on B. The B after A value may be, for example, 0.1 on a scale of zero to one, indicating that the initialization of B does not often follow the initialization of B in a time frame that suggest B is dependent on A. Alternatively, as in Table 2 below, a negative or positive polarity may represent which initialization comes first.

The boot order derivation may then estimate that the pairs of initialization events with higher sequential time-based correlation have an initialization dependency (act 702). For instance, in the above example, if the threshold value for determining dependency is 0.7, A is determined to depend on B, but B is not determined to depend on A. This threshold value may be adjusted as desired depending on the sample size for each sequential pair of computing services.

Figure 8:
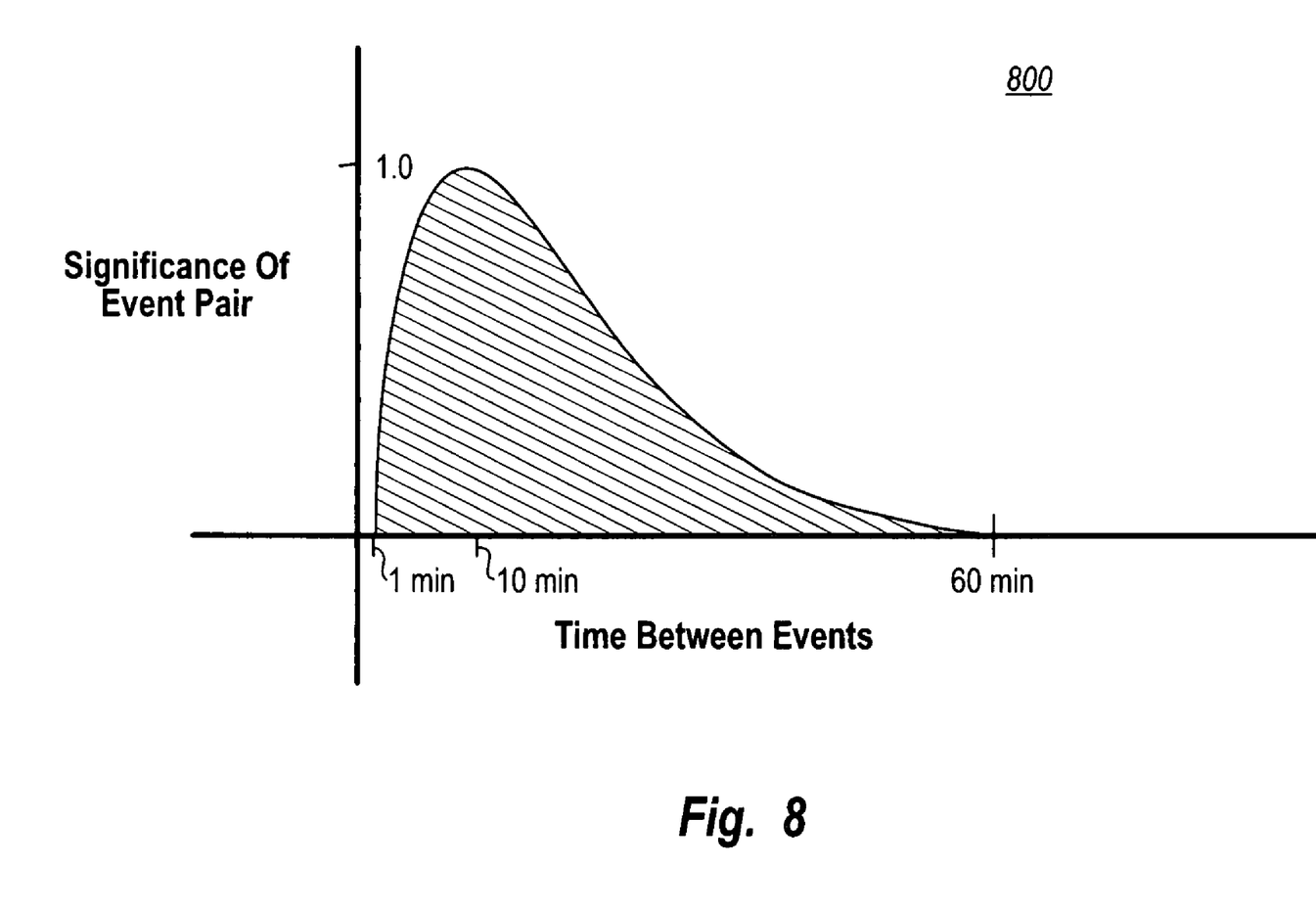
FIG. 8 illustrates a weighting function that may be used to estimate initialization dependencies.

In one embodiment, the sequential time-based correlation is weighted with a single-peak time dependency function so that the correlation tends to be lower if the period of time between initializations of the pair of computing services is within a time period that is less than a time period associated with a maximum suggested correlation, and also tends the correlation to be lower if the period of time between the initializations of the pair of computing services is longer than the time period associated with the maximum suggested correlation. FIG. 8 represents an example 800 of such a function.

Referring to FIG. 8, if the time difference between initializations is short (or even simultaneous), this would indicate that the initialization of A was not dependent on B. Referring to FIG. 8, there is no weight given to a dependency correlation in which computing service A is initialized within a minute of computing service B. This is based on the assumption that one minute is not sufficient time for computing service A to recognize the presence of computing service B, and thus the close initialization times is more likely the result of a coincidence than a real functional dependency. On the other hand, if the time between initializations is too long (in the example, more than 60 minutes), this would suggest that the service that was initialized later does not depend on the service that was initialized earlier. Otherwise, the later-initialized service would have tried to initialize earlier. Between these two extremes, there are time differences that suggest varying possibilities for the existence of a dependency.

In one example, suppose that there were five instances of the initialization of A being after the initialization of B. Suppose that in one of those events, out of coincidence, the initialization of A occurred simultaneous to the initialization of B. This would result in no increase in the dependency factor for that one sample. However, suppose that the other four initializations of A occurred 10 minutes after a corresponding initialization of B. This would result in a heavy weighting of these events in the dependency factor since 10 minutes suggests the maximum possibility of a dependency between the two using the function of FIG. 8.

Of course, the function illustrated in FIG. 8 is completely arbitrary. The precise form of the function may be altered over time as the characteristics of a particular system become better known. The function may also be improved upon through experimentation to see how much predictive behavior the function provides. Alternatively or in addition, the function may be selected by a user, and/or tuned using other measures. In one embodiment, the function is skewed using, for example, a gamma or lognormal distribution.

The following Table 2 illustrates an example matrix that may be constructed using act 701 of FIG. 7 for the initializations of ten different computing services abstractly referred to as A through J.

TABLE 2

|   | A | B | C | D | E | F | G | H | I | J |
|---|---|---|---|---|---|---|---|---|---|---|
| A | NA | | | | | | | | | |
| B | −0.30 | NA | | | | | | | | |
| C | −0.31 | 0.85 | NA | | | | | | | |
| D | 0.93 | −0.19 | −0.16 | NA | | | | | | |
| E | 0.87 | −0.46 | −0.28 | 0.89 | NA | | | | | |
| F | −0.24 | 0.99 | 0.86 | −0.16 | −0.41 | NA | | | | |
| G | −0.27 | 0.94 | 0.82 | −0.13 | −0.42 | 0.95 | NA | | | |
| H | 0.93 | −0.19 | −0.15 | 0.55 | 0.89 | −0.16 | −0.13 | NA | | |
| I | −0.44 | 0.83 | 0.96 | −0.28 | −0.42 | 0.84 | 0.84 | −0.28 | NA | |
| J | 0.89 | −0.35 | −0.21 | 0.84 | 0.93 | −0.31 | −0.38 | 0.84 | −0.38 | NA |

In Table 2, negative values indicate that the computing service in the row occurs before the computing service in the column. Conversely, positive values indicate that the computing service in the column occurs before the computing service in the row.

In this case, act 702 may involve simply identify the pair of computing services having an absolute value greater than some threshold amount (e.g., 0.7) as having a dependency.

Returning back to FIG. 5, the initialization order is then derived for the computing services in the system based on the estimated initialization dependencies (act 503). Referring back to FIG. 4, the initialization ordering may be constructed based on the following four initialization dependencies:

1) 421 depends on 422;
2) 431 depends on 432;
3) 411 depends on 421; and
4) 411 depends on 431.

In the physical boot embodiment, the derivation of an initialization ordering constitutes the derivation of a boot order, since the computing services are the physical primary computing systems, and the initializations of the primary computing systems is the same as a booting of the computing system. However, even outside of the physical boot embodiment, where the computing services are software components, the boot order of the primary computing systems themselves may be derived (act 504) based on the initialization ordering for the computing services. For instance, referred to FIG. 5, the primary computing system 330 would be booted first, followed by primary computing system 320, followed by the primary computing system 310.

Having described a mechanism for deriving the boot order, an application of the principles of the present invention to the recovery of many primary computing systems to a single recovery computing system will be described with respect to the more complex network site environment 900 illustrated in FIG. 9. The environment 900 may be, for example, a web site that is constantly operational. Such web sites rely on customers having reliable access to the services provided by the web site. Depending on the nature and size of the web site, downtime can result in significant lost revenue. Accordingly, such web sites would benefit by having contingency plans whereby services may be restored as quickly as possible even in the event of a catastrophic failure in which the primary computing systems are no longer physically available. In that case, the recovery computing system may be located some safe distance from the primary computing systems.

Figure 9:
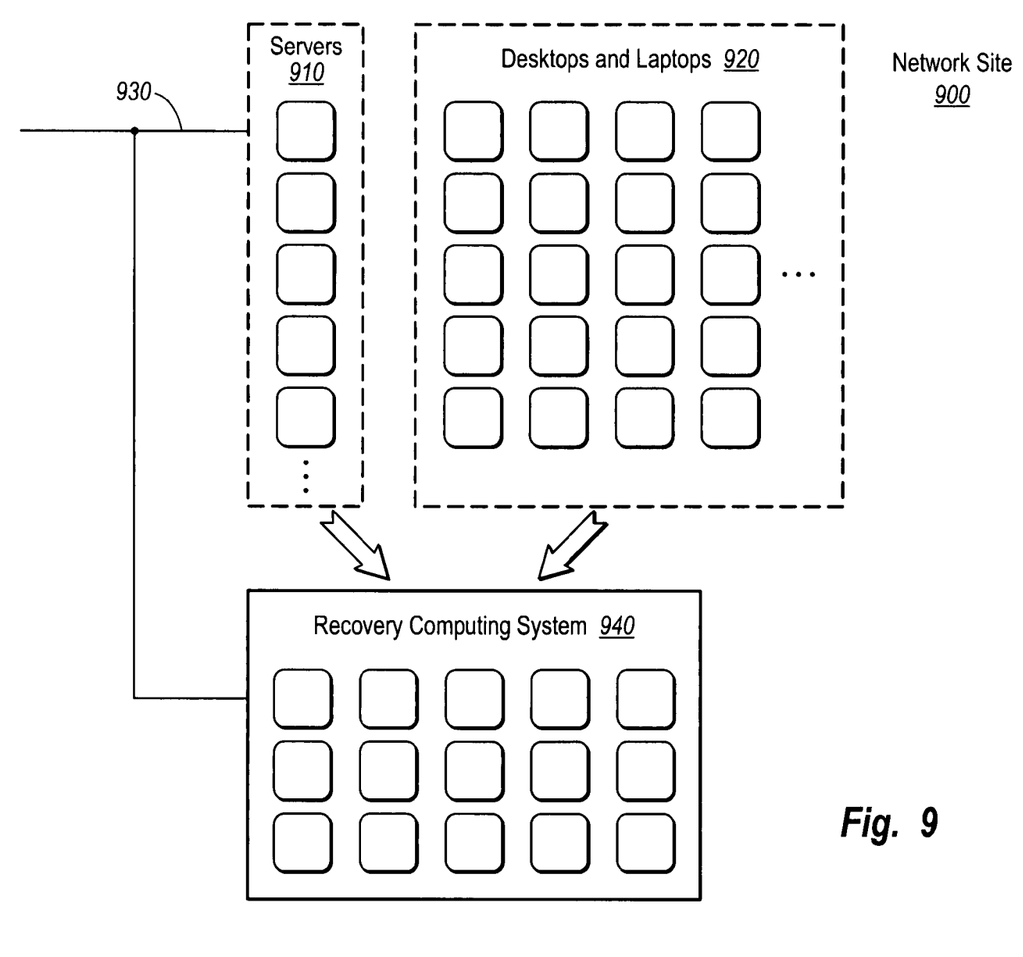
FIG. 9 illustrates a network site environment in which the principles of the present invention may be used to quickly restore an entire complex network site.

Referring to FIG. 9, the network site 900 includes multiple servers 910 that are connected to a network 930. These servers may include, for example, an Active Directory (AD) server, a Domain Name Server (DNS) server, an e-mail server, a file server, a print server, or the like. In addition, the network site 900 may also include a number of client machines such as desktops and laptops 920. Each of these servers 910 and laptops 920 may be treated as a primary computing system as described above.

The web site 900 also includes a recovery computing system 940, which has captured the running state of the servers 910 and clients 920 as of a particular point in time. Each of the running states has the injected standard device driver(s) to permit the running state to operate on the recovery computing system 940 even though the recovery computing system 940 regardless of the hardware configuration of the recovery computing system 940. The recovery computing system 940 also has access to the network 930.

In case the servers 910 and clients 920 experience a catastrophic failure and are lost, the recovery computing system 940 may quickly take over the operations of the network site 900. This would happen by activating all of the running states in an appropriate order (e.g., honoring the desired boot orders for the servers and clients), and then having the recovery computing system 940 use the various running states to continue operation. This may also be done in a testing scenario in which the servers 910 and clients 920 continue operation.

In a disaster event, once the specific hardware for the servers 910 and clients 920 has been replaced, the running states may be restored back to the appropriate replacement server or client. In the meantime, however, the recovery computing system 940 has been operational thereby preventing much lost down time.

Accordingly, the principles of the present invention allow prompt recovery from the catastrophic failure of primary computing systems even when those primary computing systems are lost, and replacement hardware is not immediately available. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for restoring access to running states of a plurality of primary computing systems onto a single computing system, the method comprising the following:
   an act of accessing a captured running state of each of the primary computing systems on the single computing system, wherein the captured running states each include, or are altered to include, at least one device driver that is configured to interface with a common virtualization component that runs on the single computing system, wherein the common virtualization component is configured to at least indirectly interface with hardware on the single computing system that operates at least part of the hardware using a different interface than the at least one device driver is configured to interface with;
   an act of identifying a boot order for each of the primary computing systems; and
   an act of booting the captured running states for each of the primary computing systems in the identified boot order on the single computing system.

2. A method in accordance with claim 1, further comprising:
   an act of capturing the running states of each of the primary computing systems.

3. A method in accordance with claim 2, further comprising:
   an act of ensuring that each of the captured running states includes at least one device driver that is configured to interface with a common virtualization component.

4. A method in accordance with claim 3, wherein the act of capturing occurs before the act of ensuring.

5. A method in accordance with claim 3, wherein the act of capturing occurs after the act of ensuring.

6. A method in accordance with claim 1, wherein the at least one device driver are each the same on each of the captured running states.

7. A method in accordance with claim 1, wherein the act of identifying a boot order for each of the primary computing systems comprises:
   an act of the single computing system receiving an identification of the boot order from a source external to the single computing system.

8. A method in accordance with claim 1, wherein the act of identifying a boot order for each of the primary computing systems comprises the following:
   an act of monitoring initialization timestamps for a plurality of computing services that operate on the primary computing systems for one or more prior initializations of the plurality of computing services;
   an act of automatically estimating one or more initialization dependencies of pairs of the plurality of computing services of the plurality of computing systems based on the act of monitoring;
   an act of automatically deriving an initialization ordering for the plurality of computing services of the plurality of primary computing systems based on the estimated one or more initialization dependencies; and
   an act of deriving the boot order based on the act of deriving the initialization ordering for the plurality of computing services of the plurality of primary computing systems.

9. A method in accordance with claim 8, wherein the act of estimating one or more initialization dependencies comprises:
   for multiple pairs of the plurality of computing services, an act of estimating a sequential time-based correlation for the pair of initialization of the computing services; and
   an act of estimating that the pairs of computing services with higher sequential time-based correlation have an initialization dependency.

10. A method in accordance with claim 8, wherein the act of monitoring initialization times for the plurality of computing services for one or more prior initializations of the plurality of computing services comprises the following:
    an act of monitoring one or more initialization event logs for each of the plurality of primary computing systems; and
    an act of filtering the one or more initialization event logs for events related to initialization of the plurality of computing services.

11. A method in accordance with claim 1, wherein the act of identifying a boot order for each of the primary computing systems comprises the following:
    an act of monitoring boot times of the plurality of primary computing systems for one or more prior boots of the plurality of primary computing systems;
    an act of automatically estimating one or more boot dependencies of the plurality of primary computing systems based on the act of monitoring; and
    an act of automatically estimating the boot order for the plurality of primary computing systems based on the estimated one or more boot dependencies.

12. A method in accordance with claim 1, wherein each of the running states is an entire volume of the corresponding primary computing system.

13. A method in accordance with claim 1, further comprising:
    an act of the common virtualization component emulating the network between at least two of the plurality of primary computing systems when the capture running states of the at least two primary computing systems attempt to communicate over the network.

14. A method in accordance with claim 1, wherein the common virtualization component is configured to interface with hardware on the single computing system using an operating system of the single computing system.

15. A computer program product comprising one or more computer-readable storage media having thereon computer-executable instructions that, when executed by one or more processors of a single computing system, cause the single computing system to perform a method for restoring access to running states of a plurality of primary computing systems onto the single computing system, the method comprising the following:
    an act of accessing a captured running state of each of the primary computing systems on the single computing system, wherein the captured running states each include, or are altered to include, at least one device driver that is configured to interface with a common virtualization component that runs on the single computing system, wherein the common virtualization component is configured to at least indirectly interface with hardware on the single computing system, at least part of the hardware using a different interface than the at least one device driver is configured to interface with;
    an act of identifying a boot order for each of the primary computing systems; and
    an act of booting the captured running states for each of the primary computing systems in the identified boot order on the single computing system.

16. A computer program product in accordance with claim 15, wherein the one or more computer-readable media are physical memory media.

17. A method for restoring access to running states of a plurality of primary computing systems onto a single computing system, the method comprising the following:
- an act of capturing the running states of each of the primary computing systems;
- an act of ensuring that each of the captured running states includes at least one device driver that is configured to interface with a common virtualization component, wherein the common virtualization component is configured to at least indirectly interface with hardware on the single computing system, at least part of the hardware using a different interface than the device driver is configured to interface with;
- an act of identifying a boot order for each of the primary computing systems; and
- an act of booting the captured running states for each of the primary computing systems in the identified boot order on the single computing system.

18. A computing system comprising:
one or more processors;
at least one hardware component;
a device driver that is configured to interface with operating systems using a hardware interface to thereby control the hardware component;
one or more computer-readable media having thereon the following:
- computer-executable instructions that, when executed by the one or more processors, causes the computing system to operating a common virtualization component that is configured to at least indirectly interface with the device driver;
- a captured running state for each of a plurality of primary computing systems, wherein each capture running state contains, or is altered to contain, at least one device driver, at least some of which operate using a different interface than the hardware interface; and
- computer-executable instructions that are structured such that, when executed by the one or more processors, they cause the computing system to perform the following:
  - an act of identifying a boot order for each of the primary computing systems; and
  - an act of booting the captured running states for each of the primary computing systems in the identified boot order on the single computing system.

19. A computing system in accordance with claim 18, wherein the computer-readable media are physical memory media.

20. A computing system in accordance with claim 18, wherein the one or more computer-readable media further having thereon:
- computer-executable instructions that are structured such that, when executed by the one or more processors, they cause the computing system to operate the operating system, wherein the common virtualization component interfaces with the device driver through the operating system.

21. A method comprising:
- inserting a first device driver into a first running state of a first computing system, the first device driver being configured to interface with a virtualization component on a recovery system;
- inserting second device driver into a second running state of a second computing system, the second device driver being configured to interface with the virtualization component on the recovery system;
- capturing the first running state of the first computing system;
- capturing the second running state of the second computing system;
- including the virtualization component on the recovery computing system;
- restoring the first running state to the recovery computing system, the first device driver interfacing with hardware of the recovery system through the virtualization component;
- restoring the second running state to the recovery computing system, the second device driver interfacing with the hardware of the recovery system through the virtualization component;
- providing access to the first and second running states.

22. The method of claim 21, further comprising:
- including an operating system on a recovery computing system, the virtualization component interfacing with the hardware of the recovery system through the operating system.

23. The method of claim 21, further comprising:
- identifying a boot order for the first and second computing systems;
- booting the first and second running states in the boot order.

24. The method of claim 23, wherein identifying a boot order further comprises:
- monitoring initialization timestamps for the first and second computing systems that operate on the computing systems for one or more prior initializations of the computing services.

25. The method of claim 21, further comprising:
- emulating a network between the first and second computing systems.

* * * * *